(12) United States Patent
Lu et al.

(10) Patent No.: US 11,059,257 B2
(45) Date of Patent: Jul. 13, 2021

(54) MULTILAYER FILM AND POUCH WITH SAME

(71) Applicant: Dow Global Technologies LLC, Midland, MI (US)

(72) Inventors: Hang Lu, Shanghai (CN); Joy Jingyi Xu, Shanghai (CN); Yutaka Maehara, Tokyo (JP); Jian-ping Pan, Shanghai (CN); Xiao Bing Yun, Beijing (CN)

(73) Assignee: Dow Global Technologies LLC, Midland, MI (US)

( * ) Notice: Subject to any disclaimer, the term of this patent is extended or adjusted under 35 U.S.C. 154(b) by 251 days.

(21) Appl. No.: 16/336,728

(22) PCT Filed: Sep. 28, 2016

(86) PCT No.: PCT/CN2016/100516
§ 371 (c)(1),
(2) Date: Mar. 26, 2019

(87) PCT Pub. No.: WO2018/058354
PCT Pub. Date: Apr. 5, 2018

(65) Prior Publication Data
US 2020/0353723 A1    Nov. 12, 2020

(51) Int. Cl.
*B32B 1/02* (2006.01)
*A61J 1/10* (2006.01)
(Continued)

(52) U.S. Cl.
CPC ............ *B32B 1/02* (2013.01); *A61J 1/10* (2013.01); *A61J 1/1468* (2015.05); *B32B 27/08* (2013.01); *B32B 27/302* (2013.01); *B32B 27/32* (2013.01); *C08L 23/12* (2013.01); *C08L 23/142* (2013.01); *C08L 53/025* (2013.01);
(Continued)

(58) Field of Classification Search
CPC ......... B32B 1/02; B32B 27/302; B32B 27/32; B32B 2250/03; B32B 2250/246; B32B 2270/00; B32B 2307/41; B32B 2307/558; B32B 2439/80; Y10T 428/1334; Y10T 428/1386; Y10T 428/31909; Y10T 428/31938; A61J 1/10; A61J 1/1468;
(Continued)

(56) References Cited

U.S. PATENT DOCUMENTS 3,700,763 A    10/1972    VanKralingen
5,272,236 A    12/1993    Lai et al.
(Continued)

FOREIGN PATENT DOCUMENTS

CN    1666856 A    9/2005
CN    103228723 A    7/2013
(Continued)

*Primary Examiner* — Walter Aughenbaugh
(74) *Attorney, Agent, or Firm* — Quarles & Brady LLP

(57) ABSTRACT

The present disclosure is directed to a retort pouch. In an embodiment, the retort pouch includes a multilayer film with at least three layers. The at least three layers include (A) a skin layer comprising a blend of a propylene-based polymer and a styrenic block copolymer, (B) a seal layer comprising blend of a propylene-based polymer and a styrenic block copolymer, and (C) a core layer located between the skin layer (A) and the seal layer (B). The core layer comprises a blend of (1) a propylene-based polymer, (2) an ethylene-based polymer, and (3) a crystalline block composite (CBC).

12 Claims, 1 Drawing Sheet

(51) Int. Cl.
*A61J 1/14* (2006.01)
*B32B 27/08* (2006.01)
*B32B 27/30* (2006.01)
*B32B 27/32* (2006.01)
*C08L 23/12* (2006.01)
*C08L 23/14* (2006.01)
*C08L 53/02* (2006.01)

(52) U.S. Cl.
CPC ..... *B32B 2250/03* (2013.01); *B32B 2250/246* (2013.01); *B32B 2270/00* (2013.01); *B32B 2307/41* (2013.01); *B32B 2307/558* (2013.01); *B32B 2439/80* (2013.01); *C08L 2205/025* (2013.01); *C08L 2205/035* (2013.01); *Y10T 428/1334* (2015.01); *Y10T 428/1386* (2015.01); *Y10T 428/31909* (2015.04); *Y10T 428/31938* (2015.04)

(58) Field of Classification Search
CPC ...... C08L 23/12; C08L 23/142; C08L 53/025; C08L 2205/025
See application file for complete search history.

(56) References Cited

U.S. PATENT DOCUMENTS

| | | |
|---|---|---|
| 5,278,272 A | 1/1994 | Lai et al. |
| 6,054,544 A | 4/2000 | Finlayson et al. |
| 6,335,410 B1 | 1/2002 | Finlayson et al. |
| 6,723,810 B2 | 4/2004 | Finlayson et al. |
| 7,355,089 B2 | 4/2008 | Chang et al. |
| 8,318,896 B2 | 11/2012 | Winniford |
| 8,785,554 B2 | 7/2014 | Li Pi Shan et al. |
| 8,822,598 B2 | 9/2014 | Li Pi Shan et al. |
| 8,822,599 B2 | 9/2014 | Li Pi Shan et al. |
| 8,921,484 B2 | 12/2014 | Liang et al. |
| 9,302,454 B2 | 4/2016 | Andre et al. |
| 9,511,567 B2 | 12/2016 | Hu et al. |
| 2003/0232212 A1 | 12/2003 | Chundury et al. |
| 2006/0199930 A1 | 9/2006 | Li Pi Shan et al. |
| 2007/0167578 A1 | 7/2007 | Arriola et al. |
| 2008/0311812 A1 | 12/2008 | Arriola et al. |
| 2010/0093964 A1 | 4/2010 | Van Damme et al. |
| 2011/0300321 A1 | 12/2011 | Hansen et al. |

FOREIGN PATENT DOCUMENTS

| | | |
|---|---|---|
| WO | 01/53079 A1 | 7/2001 |
| WO | 2005/090426 A1 | 9/2005 |
| WO | 2009/012215 A1 | 1/2009 |
| WO | 2009/114275 A1 | 9/2009 |
| WO | 2011/163187 A1 | 12/2011 |
| WO | 2011/163189 A1 | 12/2011 |
| WO | 2011/163191 A1 | 12/2011 |
| WO | 2015/010857 A1 | 1/2015 |
| WO | 2015/057423 A1 | 4/2015 |
| WO | 2015/123827 A1 | 8/2015 |
| WO | 2015/123829 A1 | 8/2015 |

MULTILAYER FILM AND POUCH WITH SAME

BACKGROUND

The performance characteristics desired in retortable packaging materials, retort pouches, and in packaging bags that must be sterilized under pressurized treatment, such as intravenous bags (IV bags), include transparency (i.e., low haze) to allow the contents to be checked, flexibility to enable liquid discharge without forming an air vent, low-temperature impact resistance so that the bag does not rupture during low-temperature storage and low-temperature transport to preserve the quality of the contents, heat resistance so that deformation and fusion do not occur even when sterilization at 121° C. is carried out, and fabricability such as heat-sealability to facilitate bag-making.

IV bags composed primarily of polyethylene, exhibit good flexibility and impact resistance; however, polyethylene IV bags have poor heat resistance and thus give rise to appearance defects such as deformation at a sterilization temperature of 121° C. Consequently, polyethylene alone is incapable of functioning satisfactorily in IV bag applications. IV bags composed primarily of polypropylene have good heat resistance, but are hard as an IV bag material and have an inadequate impact resistance at low temperatures. As a result, polypropylene is unable to satisfy the above performance characteristics for retort pouches.

It is known to add styrene-based elastomer to improve the flexibility and impact resistance of polypropylene. However, the addition of styrene-based elastomer to polypropylene diminishes heat resistance and transparency. Moreover, styrene-based elastomers are more expensive than olefin-based elastomers, economically disfavoring styrene-based elastomers in commercial use. Hence, the art recognizes the need for improved film materials for use in retort pouches, and IV bags in particular.

SUMMARY

The present disclosure is directed to a retort pouch. In an embodiment, the retort pouch includes a multilayer film with at least three layers. The at least three layers include (A) a skin layer comprising a blend of a propylene-based polymer and a styrenic block copolymer, (B) a seal layer comprising blend of a propylene-based polymer and a styrenic block copolymer, and (C) a core layer located between the skin layer (A) and the seal layer (B). The core layer comprises a blend of (1) a propylene-based polymer, (2) an ethylene-based polymer, and (3) a crystalline block composite (CBC).

In an embodiment, the core layer (C) is void of styrene.

DEFINITIONS AND TEST METHODS

Figure 1:
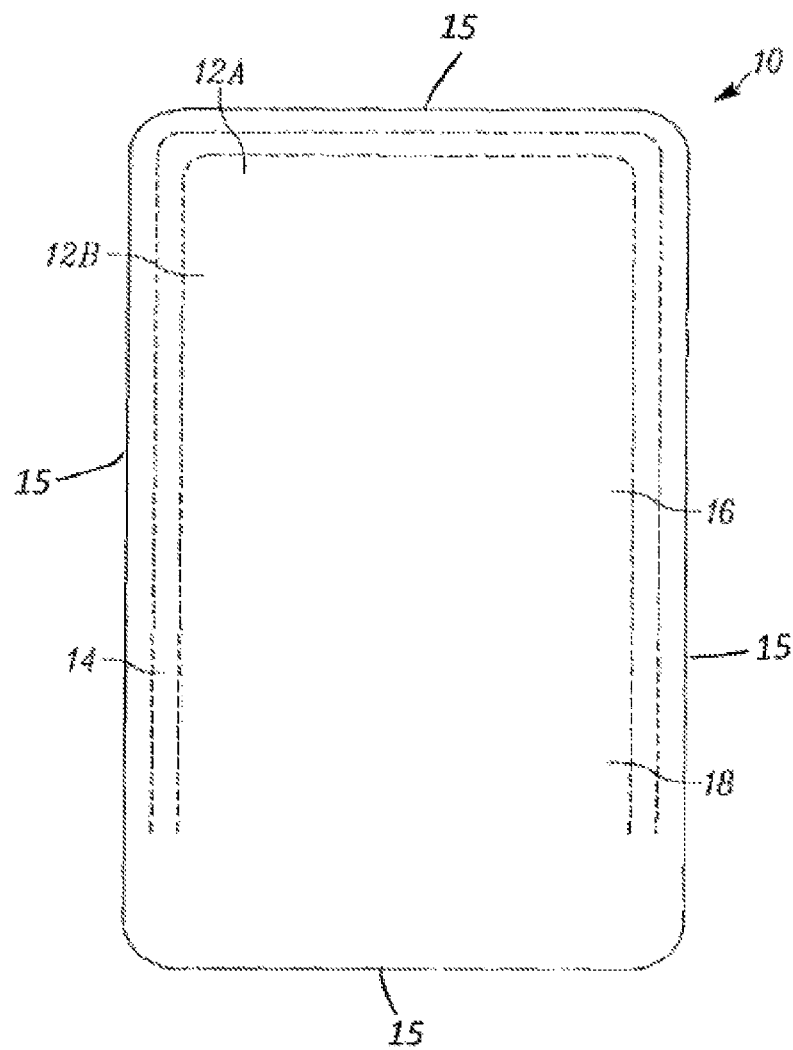
FIG. 1 is a plan view of a retort pouch in accordance with an embodiment of the present disclosure.
Figure 2:
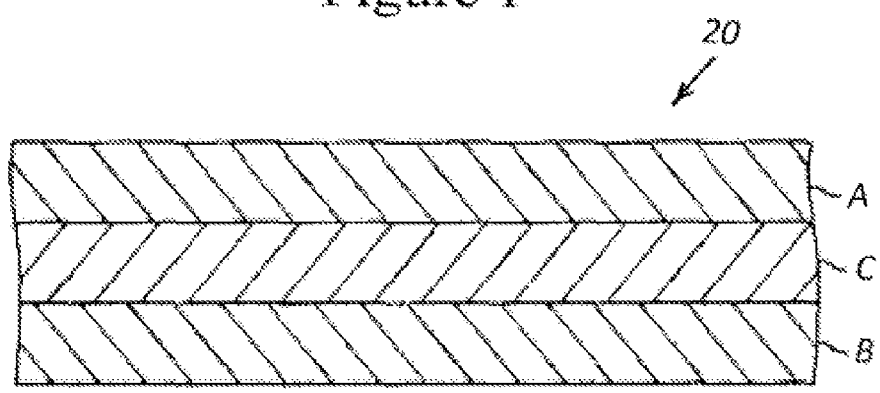
FIG. 2 is an elevation view of a multi-layer film in accordance with an embodiment of the present disclosure.

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all components and percents are based on weight. For purposes of United States patent practice, the contents of any patent, patent application, or publication referenced herein are hereby incorporated by reference in their entirety (or the equivalent US version thereof is so incorporated by reference).

The numerical ranges disclosed herein include all values from, and including, the lower value and the upper value. For ranges containing explicit values (e.g., 1, or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all components and percents are based on weight, and all test methods are current as of the filing date of this disclosure.

"Blend," "polymer blend" and like terms is a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate can comprise a blend.

$^{13}$C Nuclear Magnetic Resonance (NMR)

Sample Preparation

The samples are prepared by adding approximately 2.7 g of a 50/50 mixture of tetrachloroethane-d2/orthodichlorobenzene that is 0.025M in chromium acetylacetonate (relaxation agent) to 0.21 g sample in a 10 mm NMR tube. The samples are dissolved and homogenized by heating the tube and its contents to 150° C.

Data Acquisition Parameters

The data is collected using a Bruker 400 MHz spectrometer equipped with a Bruker Dual DUL high-temperature CryoProbe. The data is acquired using 320 transients per data file, a 7.3 sec pulse repetition delay (6 sec delay+1.3 sec acq. time), 90 degree flip angles, and inverse gated decoupling with a sample temperature of 125° C. All measurements are made on non spinning samples in locked mode. Samples are homogenized immediately prior to insertion into the heated (130° C.) NMR Sample changer, and are allowed to thermally equilibrate in the probe for 15 minutes prior to data acquisition.

"Composition" and like terms is a mixture of two or more materials. Included in compositions are pre-reaction, reaction and post-reaction mixtures the latter of which will include reaction products and by-products as well as unreacted components of the reaction mixture and decomposition products, if any, formed from the one or more components of the pre-reaction or reaction mixture.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Dart impact strength at −10° C. is measured in accordance with ASTM D 3763 using an INSTRON 9250 apparatus. Liquid nitrogen was used to cool down the temperature in environmental chamber.

Density is measured in accordance with ASTM D 792, with values reported as grams per cubic centimeter, g/cc.

Differential Scanning calorimetry is performed on a TA Instruments 01000 DSC equipped with an RCS cooling accessory and an auto sampler. A nitrogen purge gas flow of 50 ml/min is used. The sample is pressed into a thin film and melted in the press at about 230° C. and then air-cooled to room temperature (25° C.). About 3-10 mg of material is then cut, accurately weighed, and placed in a light aluminum pan (ca 50 mg) which is later crimped shut. The thermal behavior of the sample is investigated with the following temperature profile: the sample is rapidly heated to 230° C. and held isothermal for 3 minutes in order to remove any previous thermal history. The sample is then cooled to −90° C. at 10° C./min cooling rate and held at −90° C. for 3 minutes. The sample is then heated to 230° C. at 10° C./min heating rate. The cooling and second heating curves are recorded.

An "ethylene-based polymer" and like terms is an olefin-based polymer that comprises more than 50 weight percent polymerized ethylene monomer (based on the total amount of polymerizable monomers).

"Haze" refers to the light scattering property of a film, low haze films scattering less visible light than high haze films. Haze is measured in accordance with ASTM D1003, using a BYK-Gardner Haze Meter 4725 with values reported in percent (%). Film thickness for haze measurement is 190 microns.

High Temperature Liquid Chromatography (HTLC)

HTLC is performed according to the methods disclosed in US Patent Application Publication No. 2010-0093964 and U.S. patent application Ser. No. 12/643,111, filed Dec. 21, 2009, both of which are herein incorporated by reference. Samples are analyzed by the methodology described below.

A Waters GPCV2000 high temperature SEC chromatograph was reconfigured to build the HT-2DLC instrumentation. Two Shimadzu LC-20AD pumps were connected to the injector valve in GPCV2000 through a binary mixer. The first dimension (D1) HPLC column was connected between the injector and a 10-port switch valve (Valco Inc). The second dimension (D2) SEC column was connected between the 10-port valve and LS (Varian Inc.), IR (concentration and composition), RI (refractive index), and IV (intrinsic viscosity) detectors. RI and IV were built-in detector in GPCV2000. The IR5 detector was provided by Polymer-Char, Valencia, Spain.

Columns:

The D1 column was a high temperature Hypercarb graphite column 2.1×100 mm) purchased from Thermo Scientific. The D2 column was a PLRapid-H column purchased from Varian (10×100 mm).

Reagents:

HPLC grade trichlorobenzene (TCB) was purchased from Fisher Scientific. 1-Decanol and decane were from Aldrich. 2,6-Di-tert-butyl-4-methylphenol (Ionol) was also purchased from Aldrich.

Sample Preparation:

0.01-0.15 g of polyolefin sample was placed in a 10-mL Waters auto sampler vial. 7-mL of either 1-decanol or decane with 200 ppm Ionol was added to the vial afterwards. After sparging helium to the sample vial for about 1 min, the sample vial was put on a heated shaker with temperature set at 160° C. The dissolution was done by shaking the vial at the temperature for 2 hr. The vial was then transferred to the auto sampler for injection. Please note that the actual volume of the solution was more than 7 mL due to the thermal expansion of the solvent.

HT-2DLC:

The D1 flow rate was at 0.01 mL/min. The composition of the mobile phase was 100% of the weak eluent (1-decanol or decane) for the first 10 min of the run. The composition was then increased to 60% of strong eluent (TCB) in 489 min. The data were collected for 489 min as the duration of the raw chromatogram. The 10-port valve switched every three minutes yielding 489/3=163 SEC chromatograms. A post-run gradient was used after the 489 min data acquisition time to clean and equilibrate the column for the next run:

Clean Step:

1. 490 min: flow=0.01 min; //Maintain the constant flow rate of 0.01 mL/min from 0-490 min. 2. 491 min: flow=0.20 min; //Increase the flow rate to 0.20 mL/min. 3. 492 min: % B=100; //Increase the mobile phase composition to 100% TCB 4. 502 min: % B=100; //Wash the column using 2 mL of TCB Equilibrium Step: 5. 503 min: % B=0; //Change the mobile phase composition to 100% of 1-decanol or decane 6. 513 min: % B=0; //Equilibrate the column using 2 mL of weak eluent 7. 514 min: flow=0.2 mL/min; //Maintain the constant flow of 0.2 mL/min from 491-514 min 8. 515 min: flow=0.01 mL/min; //Lower the flow rate to 0.01 mL/min.

After step 8, the flow rate and mobile phase composition were the same as the initial conditions of the run gradient.

The D2 flow rate was at 2.51 mL/min. Two 60 μL loops were installed on the 10-port switch valve. 30 μL of the eluent from D1 column was loaded onto the SEC column with every switch of the valve.

The IR, L515 (light scattering signal at 15°), L590 (light scattering signal at 90°), and IV (intrinsic viscosity) signals were collected by EZChrom through a SS420X analogue-to-digital conversion box. The chromatograms were exported in ASCII format and imported into a home-written MATLAB software for data reduction. Using an appropriate calibration curve of polymer composition and retention volume, of polymers that are of similar nature of the CAOB and CEB polymers being analyzed. Calibration polymers should be narrow in composition (both molecular weight and chemical composition) and span a reasonable molecular weight range to cover the composition of interest during the analysis. Analysis of the raw data was calculated as follows, the first dimension HPLC chromatogram was reconstructed by plotting the IR signal of every cut (from total IR SEC chromatogram of the cut) as a function of the elution volume. The IR vs. D1 elution volume was normalized by total IR signal to obtain weight fraction vs. D1 elution volume plot. The IR methyl/measure ratio was obtained from the reconstructed IR measure and IR methyl chromatograms. The ratio was converted to composition using a calibration curve of PP wt. % (by NMR) vs. methyl/measure obtained from SEC experiments. The MW was obtained from the reconstructed IR measure and LS chromatograms. The ratio was converted to MW after calibration of both IR and LS detectors using a PE standard.

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

Melt flow rate (MFR) is measured in accordance with ASTM D 1238, Condition 230° C./2.16 kg (g/10 minutes).

Melt index (MI) is measured in accordance with ASTM D 1238, Condition 190° C./2.16 kg (g/10 minutes).

Molecular weight distribution (Mw/Mn) is measured using Gel Permeation Chromatography (GPC). In particular, conventional GPC measurements are used to determine the weight-average (Mw) and number-average (Mn) molecular weight of the polymer and to determine the Mw/Mn. The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, J. Polym. Sci., Polym. Let., 6, 621 (1968)):

$$M_{polypropylene}=0.645(M_{polystyrene}).$$

Polypropylene equivalent molecular weight calculations are performed using Viscotek TriSEC software Version 3.0.

An "olefin-based polymer," as used herein, is a polymer that contains more than 50 weight percent polymerized olefin monomer (based on total amount of polymerizable monomers), and optionally, may contain at least one comonomer. Nonlimiting examples of olefin-based polymer include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer.

DETAILED DESCRIPTION

The present disclosure provides a retort pouch. In an embodiment, the retort pouch includes a multilayer film with at least three layers. The multilayer film includes (A) a skin layer comprising a blend of a propylene-based polymer and a styrenic block copolymer;

(B) a seal layer comprising a blend of propylene-based polymer and a styrenic block copolymer; and (C) a core layer located between the skin layer (A) and the seal layer (B). The core layer is blend of (1) a propylene-based polymer, (2) an ethylene-based polymer, and (3) a crystalline block composite (CBC).

1. Retort Pouch

Referring to the drawings, and initially to FIG. 1, a retort pouch is shown and indicated generally by the reference numeral 10. As used herein, "a retort pouch" is a flexible package that can remain airtight and sealed after exposure to temperatures from 120° C.–135° C., alone or in combination with a pressure up to 500 kPa for 30-80 minutes. Consequently, the term "post retort" refers to the pouch after the pouch has been subjected to a retort process which exposes the pouch to temperatures from 110° C.–135° C., alone or in combination with steam and/or up to 500 kPa pressure for 30-80 minutes. The retort pouch 10 includes two sheets 12A and 12B of multi-layer film, joined and heat sealed together about their respective peripheries by a heat seal 14. The heat seal 14 may extend along the entire common periphery of sheets 12A, 12B. Alternatively, the heat seal 14 may extend along a portion of the common periphery of sheets 12A, 12B. A storage space 16 is defined by the area between the two sheets 12A, 12B and within the heat seal 14. The storage space 16 is sealed off from the surrounding environment and contains the contents 18, of the retort pouch, for example, foodstuffs or medicaments. While the package is described as having two sheets 12A, 12B, it is understood that a single sheet could be used. The single sheet could be folded upon itself to form the two layers. The three unconnected edges would then be heat sealed after the contents are placed between the folded-over layers.

In an embodiment, the retort pouch 10 is an IV bag and includes one or more ports (injection port and/or discharge port) sandwiched between the sheets 12A, 12B and heat sealed perpendicularly across the common periphery of the sheets 12A, 12B.

The sheets 12A, 12B of the retort pouch 10 are manufactured from a multilayer film 20 having at least three layers. The multilayer film 20 includes a skin layer A, a seal layer B, and a core layer C. The core layer C is located between the skin layer A and the seal layer B. Contact between layers A, B, and C can be "direct" (immediate and/or intimate touch) or "indirect" (intervening adhesive layer and/or intervening structure between film layers).

In an embodiment, the skin layer A is in indirect contact with the core layer C and the core layer C is in indirect contact with the seal layer B. One or more additional layers (tie layer(s) and/or intermediate layer(s)) is present between the skin layer A and the core layer C. One or more additional layers (tie layer(s) and/or intermediate layer(s)) is present between the core layer C and the seal layer B.

In an embodiment, the multilayer film 20 includes skin layer A in direct contact with the core layer C, and the core layer C in direct contact with the seal layer B yielding an A/C/B layer configuration. No intervening layers exist between the skin layer A and the core layer C. Similarly, no intervening layers exist between core layer C and seal layer B. Seal layers B oppose each other and form the heat seal 14 along a common periphery 15 of the retort pouch 10.

The thickness of layers A, B, and C may be the same or different. In an embodiment, the thickness of at least two of the skin layer, the seal layer, and the core layer is different. In a further embodiment, the thickness of the skin layer is the same as the thickness of the seal layer.

2. Skin layer

The multilayer film includes a skin layer A. The skin layer is the outermost layer of the multilayer film. As such, the skin layer is the layer furthest away from the contents 18 of the retort pouch. The skin layer is composed of a polymeric blend of a propylene-based polymer and a styrenic-based block copolymer.

A. Propylene-Based Polymer

The skin layer includes a propylene-based polymer. A "propylene-based polymer" is a propylene homopolymer or a propylene/α-olefin copolymer. The propylene-based polymer can be prepared with either Ziegler-Natta, chromium-based, constrained geometry or metallocene catalysts in slurry reactors, gas phase reactors or solution reactors.

The propylene/α-olefin copolymer can include propylene and one or more $C_2$ or $C_4$-$C_{20}$ α-olefin, or $C_4$-$C_8$ α-olefin comonomers. The comonomer(s) can be linear or branched. Nonlimiting examples of suitable comonomers include ethylene, 1-butene, 1 pentene, 4-methyl-1-pentene, 1-hexene, and 1-octene. The propylene/α-olefin copolymer includes at least 50 percent by weight propylene polymerized therein, or at least 70 percent by weight, or at least 80 percent by weight, or at least 85 percent by weight, or at least 90 weight percent, or at least 95 percent by weight propylene in polymerized form.

Nonlimiting examples of suitable propylene-based polymer for layer A include a propylene homopolymer (hPP), random propylene/α-olefin copolymer (rPP), impact propylene copolymer (hPP+at least one elastomeric impact modifier) (ICPP) or high impact polypropylene (HIPP), high melt strength polypropylene (HMS-PP), isotactic polypropylene (iPP), syndiotactic polypropylene (sPP), propylene/ethylene/butene terpolymer, and combinations thereof.

In an embodiment, the propylene-based polymer is a propylene homopolymer having one, some, or all of the following properties:

(i) a density from 0.900 g/cc, or 0.905 g/cc to 0.907 g/cc, or 0.91 g/cc, and/or (ii) a melt temperature, Tm, greater than 155° C.; and/or (iii) a melt flow rate (MFR) from 0.5 g/10 min, or 1.0 g/10 min, or 3.0 g/10 min, or 5.0 g/10 min to 6.0 g/10 min, or 7.0 g/10 min, or 8.0 g/10 min.

In an embodiment, the propylene-based polymer in the skin layer is a propylene homopolymer having a density of 0.900 g/cc and a MFR from 6.0/10 min, or 6.5 g/10 min, or 7.0 g/10 min, or 7.5 g/10 min to 8.0 g/10 min, or 8.5 g/10 min.

A nonlimiting example of a suitable propylene homopolymer is Purell HP570M available from LyondellBasell Industries.

In an embodiment, the propylene-based polymer is a propylene/ethylene/butene terpolymer having one or all of the following properties;

(i) a melt temperature, Tm, from 135° C., or 137° C., or 140° C. to 143° C., or 145° C.; and/or (ii) a melt flow rate (MFR) from 0.5 g/10 min, or 1.0 g/10 min, or 3.0 g/10 min, or 5.0 g/10 min to 6.0 g/10 min, or 7.0 g/10 min, or 8.0 g/10 min.

B. Styrenic Block Copolymer

The skin layer also includes a styrenic block copolymer. A "styrenic block copolymer" is an elastomer having at least one block segment of a styrenic monomer in combination with another block segment of another comonomer. The structure of the styrenic monomer (styrene) is shown as Structure (1) below.

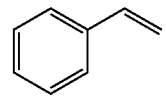

Structure (1)

The structure of the styrene block copolymer can be of the linear or radial type, and of the diblock or triblock type.

Nonlimiting examples of suitable styrenic block copolymer includes styrene-isoprene-styrene block copolymers (SIS), styrene-butadiene-styrene block copolymers (SBS), styrene-ethylene/butylene-styrene block copolymers (SEBS), styrene-isobutylene-styrene block copolymers (SIBS), styrene-ethylene-propylene-styrene block copolymers (SEPS), and mixtures thereof. Styrenic block copolymers are available from Dexco Polymers under the trademark VECTOR®, from Kraton Corporation under the trademark KRATON® (e.g., KRATON® FG1901 G), and from Dynasol, under the trademark SOLPRENE® 4114A, 4213A, and the like.

The skin layer includes from 80 wt %, or 85 wt % to 90 wt % to 95 wt % propylene-based polymer and a reciprocal amount of the styrenic block copolymer, or from 20 wt %, or 15 wt % to 10 wt %, or 5 wt % of the styrenic block copolymer. It is understood that the aggregate weight percent of the propylene-based polymer and the weight percent of the styrenic block copolymer yields 100 weight percent. Weight percent is based on the total weight of the skin layer. In an embodiment, the skin layer A includes a propylene homopolymer and a SEBS each in the foregoing respective weight percentages.

3. Seal Layer B

The multilayer film includes a seal layer B. The seal layer is the innermost layer of the multilayer film. As such, the seal layer is the layer in direct contact with the contents 18 of the retort pouch. The seal layer is composed of a polymeric blend of a propylene-based polymer and a styrenic block copolymer.

The propylene-based polymer can be any propylene-based polymer as previously disclosed with respect to the skin layer. Similarly, the styrenic block copolymer for the seal layer can be any styrenic block copolymer as previously disclosed with respect to the skin layer.

In an embodiment, the styrenic block copolymer in the skin layer A is the same as the styrenic block copolymer in the seal layer B.

In an embodiment, the propylene-based polymer in the seal layer is a propylene/α-olefin copolymer. The propylene/α-olefin copolymer includes one or more $C_2$ or $C_{4-6}$ α-olefin comonomers. In a further embodiment, the propylene/α- olefin copolymer is a propylene/ethylene copolymer having from 3 wt %, or 4 wt %, or 5 wt %, or 6 wt %, or 7 wt % to 8 wt %, or 9 wt %, or 10 wt %, or 11 wt %, or 12 wt %, or 13 wt %, or 14 wt %, or 15 wt % ethylene comonomer (based on total weight of the propylene/α-olefin interpolymer).

In an embodiment, the propylene-based polymer for the seal layer is a propylene/α-olefin terpolymer composed of propylene, ethylene comonomer, and also butene comonomer.

In an embodiment, the propylene/α-olefin copolymer is a propylene/ethylene copolymer with from 3 wt % to less than 5 wt % ethylene comonomer and having one, some, or all of the following properties:

(i) a density from 0.880 g/cc, or 0.885 g/cc, or 0.890 g/cc to 0.895 g/cc, or 0.900 g/cc; and/or (ii) a melt temperature, Tm, from 130° C., or 135° C. to 140° C., or 145° C.; and/or (iii) a melt flow rate from 0.5 g/10 min, or 1.0 g/10 min, or 1.5 g/10 min, or 2.0 g/10 min, or 2.5 g/10 min to 3.0 g/10 min, or 3.5 g/10 min, or 4.0 g/10 min, or 4.5 g/10 min, or 5.0 g/10 min to 5.5 g/10 min, or 6.0 g/10 min, or 6.5 g/10 min, or 7.0 g/10 min, or 7.5 g/10 min, or 8.0 g/10 min.

Such propylene/α-olefin interpolymers are commercially available from Lyonbasell, under the trade name Purell.

The seal layer B includes from 80 wt %, or 85 wt % to 90 wt %, or 95 wt % of the propylene/α-olefin copolymer and a reciprocal amount of the styrenic block copolymer, or from 20 wt %, or 15 wt % to 10 wt %, or 5 wt % of the styrenic block copolymer. Weight percent is based on total weight of the seal layer. In an embodiment, the seal layer B includes a propylene/ethylene copolymer and a SEBS each in the foregoing respective weight percentages.

4. Core Layer C

The core layer is a blend of a propylene-based polymer, an ethylene-based polymer and a crystalline block composite. The core layer is free of, or otherwise is void of, styrene. In other words, the styrenic monomer of Structure (1) is absent from the core layer C.

A. Propylene-Based Polymer

The propylene-based polymer can be any propylene-based polymer as disclosed above. In an embodiment, the propylene-based polymer is a propylene/α-olefin comonomer having one or more $C_2$ or $C_4$-$C_8$ α-olefin comonomers. Nonlimiting examples of suitable comonomers include ethylene, 1-butene, 1 pentene, 4-methyl-1-pentene, 1-hexene, and 1-octene.

In an embodiment, the propylene/α-olefin comonomer in the core layer is a propylene/ethylene copolymer with from 3 wt % to less than 5 wt % ethylene comonomer and having one, some, or all of the following properties:

(i) a density from 0.880 g/cc, or 0.885 g/cc, or 0.890 to 0.895 g/cc, or 0.90 g/cc; and/or (ii) a melt temperature, Tm, from 130° C., or 135° C., or 140° C. to 145° C., or 150° C.; and/or (iii) a melt flow rate from 0.5 g/10 min, or 1.0 g/10 min, or 1.5 g/10 min, or 2.0 g/10 min, or 2.5 g/10 min to 3.0 g/10 min, or 3.5 g/10 min, or 4.0 g/10 min, or 4.5 g/10 min, or 5.0 g/10 min to 5.5 g/10 min, or 6.0 g/10 min, or 6.5 g/10 min, or 7.0 g/10 min or 7.5 g/10 min, or 8.0 g/10 min.

Such propylene/α-olefin interpolymers are commercially available from Lyonbasell, under the trade name Purell.

B. Ethylene-Based Polymer

The core layer also includes an ethylene-based polymer. The ethylene-based polymer can be an ethylene homopolymer or an ethylene/α-olefin copolymer.

In an embodiment, the ethylene-based polymer is an ethylene/α-olefin copolymer. The comonomer may be one or more $C_{3-20}$ α-olefin comonomers, or one or more $C_{4-8}$ α-olefin comonomers.

Nonlimiting examples of suitable $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane.

Illustrative ethylene/α-olefin copolymers include ethylene/propylene, ethylene/butene, ethylene/1-hexene, ethylene/1-octene, and the like.

In an embodiment, the ethylene-based polymer is an ethylene-based elastomer. An "elastomer" is a rubber-like polymer that can be stretched to at least twice its original length and which retracts very rapidly to approximately its original length when the force exerting the stretching is released. An elastomer has an elastic modulus of about 10,000 psi (68.95 MPa) or less and an elongation usually greater than 200% in the uncrosslinked state at room temperature using the method of ASTM D638. An "ethylene-based elastomer," is an elastomer comprising at least 50 wt % units derived from ethylene, with the foregoing elastomeric properties.

In an embodiment, the ethylene-based elastomer is a substantially linear ethylene/α-olefin polymer. A substantially linear ethylene/α-olefin interpolymer (SLEP) is a homogeneously branched polymer and is described in U.S. Pat. Nos. 5,272,236; 5,278,272; 6,054,544; 6,335,410 and 6,723,810; each incorporated herein by reference. The substantially linear ethylene/α-olefin interpolymers have long chain branching. The long chain branches have the same comonomer distribution as the polymer backbone, and can have about the same length as the length of the polymer backbone. "Substantially linear," typically, is in reference to a polymer that is substituted, on average, with "0.01 long chain branches per 1000 carbons" to "3 long chain branches per 1000 carbons." The length of a long chain branch is longer than the carbon length of a short chain branch, formed from the incorporation of one comonomer into the polymer backbone.

Some polymers may be substituted with 0.01 long chain branches per 1000 total carbons to 3 long chain branch per 1000 total carbons, more preferably from 0.05 long chain branches per 1000 total carbons to 2 long chain branch per 1000 total carbons, and especially from 0.3 long chain branches per 1000 total carbons to 1 long chain branch per 1000 total carbons.

Long chain branching can be determined by using 13C Nuclear Magnetic Resonance (NMR) spectroscopy, and can be quantified using the method of Randall (Rev. Macromol. Chem. Phys., C29 (2 &3), 1989, p. 285-297), the disclosure of which is incorporated herein by reference. Two other methods are Gel Permeation Chromatography, couple with a Low Angle Laser Light Scattering detector (GPCLALLS), and Gel Permeation Chromatography, coupled with a Differential Viscometer detector (GPC-DV). The use of these techniques for long chain branch detection, and the underlying theories, have been well documented in the literature. See, for example, Zimm, B. H. and Stockmayer, W. H., J. Chem. Phys., 17,1301 (1949) and Rudin, A., Modern Methods of Polymer Characterization, John Wiley & Sons, New York (1991) pp. 103-112.

In an embodiment, the ethylene-based elastomer is an ethylene/$C_4$-$C_8$ α-olefin copolymer having the foregoing elastomeric properties. In a further embodiment, the α-olefin comonomer is a $C_4$-$C_8$ α-olefin selected from 1-butene, 1-hexene, or 1-octene.

In an embodiment, the ethylene-based elastomer is an ethylene/$C_4$-$C_8$ α-olefin copolymer having one, some, or all of the following properties:

(i) a density from 0.860 g/cc, or 0.870/cc, or 0.880 g/cc to 0.885 g/cc, or 0.890, or 0.895, or less than 0.900 g/cc; and/or (ii) a vicat softening temperature from 40° C., or 45° C., or 50° C., or 55° C., or 60° C., or 61° C., or 62° C. to 63° C., or 64° C., or 65° C.; and/or (iii) a melting temperature, Tm, from 50, or 55, or 60° C., or 63° C., or 65° C., or 67° C., or 69° C. to 70° C., or 72° C., or 73° C. to 75° C., or 77° C., or 79° C., or 80° C.; and/or (iv) a melt index from 0.5 g/10 min, or 1.0 g/10 min, or 1.5 g/10 min, or 2.0 g/10 min, or 2.5 g/10 min to 3.0 g/10 min, or 3.5 g/10 min, or 4.0 g/10 min, or 4.5 g/10 min, or 5.0 g/10 min, or 6.0 g/10 min, or 7.0 g/10 min, or 7.5 g/10 min, or 8.0 g/10 min.

Nonlimiting examples of suitable ethylene-based elastomers include polymers sold under the tradenames ENGAGE' and AFFINITY' (each of which is a SLEP) available from The Dow Chemical Company.

C. Crystalline Block Composite

Core layer (C) includes a crystalline block composite (or "CBC"). The term "block copolymer" or "segmented copolymer" refers to a polymer comprising two or more chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. In an embodiment, the blocks differ in the amount or type of comonomer incorporated therein, the density, the amount of crystallinity, the type of crystallinity (e.g., polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The block copolymers of the present disclosure are characterized by unique distributions of both polymer polydispersity (Mw/Mn) and block length distribution, due, in an embodiment, to the effect of a shuttling agent(s) in combination with the catalyst(s).

The term "crystalline block composite" (CBC) (including the term "crystalline block copolymer composite") refers to a composite comprising three parts: a crystalline ethylene based polymer (CEP), a crystalline alpha-olefin based polymer (CAOP), and a block copolymer having a crystalline ethylene block (CEB) and a crystalline alpha-olefin block (CAOB), wherein the CEB of the block copolymer is the same composition as the CEP in the block composite and the CAOB of the block copolymer is the same composition as the CAOP of the block composite. The three parts are present together as one component. Additionally, the compositional split between the amount of CEP and CAOP will be the same as that between the corresponding blocks in the block copolymer. The block copolymers can be linear or branched. More specifically, each of the respective block segments can contain long chain branches, but the block copolymer segment is substantially linear as opposed to containing grafted or branched blocks. When produced in a continuous process, the crystalline block composite desirably possesses Mw/Mn from 1.7 to 15, or from 1.8 to 10, or from 1.8 to 5, or from 1.8 to 3.5. Such crystalline block composite is described in, for example, the following filed patent applications: PCT/US11/41189; U.S. Ser. No. 13/165,054; PCT/US11/41191; U.S. Ser. No. 13/165,073; PCT/US11/41194; and U.S. Ser. No. 13/165,096; all filed on 21 Jun. 2011 and incorporated herein by reference with respect to descriptions of the crystalline block composites, processes to make them and methods of analyzing them.

CAOB refers to highly crystalline blocks of polymerized alpha olefin units in which the monomer is present in an amount from 90 mol percent, or 93 mol percent, or 95 mol percent to 96 mol percent, or 97 mol percent, or 98 mol percent, or 99 mol percent, or 100 mol percent. In other words, the comonomer content in the CAOBs is 10 mol percent, or 7 mol percent, or 5 mol percent to 4 mol percent, or 3 mol percent, or 2 mol percent, or 1 mol percent, or 0 mol percent. CAOBs with propylene crystallinity have corresponding melting points from 80° C., or 85° C., or 90° C., or 95° C. to 100° C., or 105° C., or 110° C., or 115° C., or 120° C. In an embodiment, the CAOB comprises all, or substantially all, propylene units.

CEB, on the other hand, refers to blocks of polymerized ethylene units in which the comonomer content is from 0 mol %, or greater than 0 mol %, or 1 mol %, or 3 mol %, or 5 mol %, to 7 mol %, or 9 mol %, or 10 mol %. Such CEB has a corresponding melting point from 75° C., or 90° C. to 95° C., or 100° C.

"Hard" segments refer to highly crystalline blocks of polymerized units in which the monomer is present in an amount from greater than 90 mol %, or 93 mol %, or 95 mol % to 97 mol %, or 98 mol %, or 99 mol %, or 100 mol %. In other words, the comonomer content in the hard segments is from 0 mol %, or 1 mol %, or 2 mol %, or 5 mol % to 7 mol %, or 10 mol %. In an embodiment, the hard segments comprise all, or substantially all, propylene units. "Soft" segments, on the other hand, refer to amorphous, substantially amorphous, or elastomeric blocks of polymerized units in which the comonomer content is from greater than 10 mol %, or 20 mol %, or 33 mol % to 70 mol %, or 80 mol %, or less than 90 mol %.

In an embodiment, the CBC is prepared by a process comprising contacting an addition polymerizable monomer or mixture of monomers under addition polymerization conditions with a composition comprising at least one addition polymerization catalyst, a cocatalyst and a chain shuttling agent, said process being characterized by formation of at least some of the growing polymer chains under differentiated process conditions in two or more reactors operating under steady state polymerization conditions or in two or more zones of a reactor operating under plug flow polymerization conditions. In a further embodiment, the CBC comprises a fraction of block polymer which possesses a most probable distribution of block lengths.

Suitable processes useful in producing the block composites and crystalline block composites may be found, for example, in US Patent Application Publication No. 2008/0269412, published on Oct. 30, 2008, which is herein incorporated by reference.

When producing a block polymer having a crystalline ethylene block (CEB) and a crystalline alpha-olefin block (CAOB) in two reactors or zones it is possible to produce the CEB in the first reactor or zone and the CAOB in the second reactor or zone or to produce the CAOB in the first reactor or zone and the CEB in the second reactor or zone. It is more advantageous to produce CEB in the first reactor or zone with fresh chain shuttling agent added. The presence of increased levels of ethylene in the reactor or zone producing CEB will typically lead to much higher molecular weight in that reactor or zone than in the zone or reactor producing CAOB. The fresh chain shuttling agent will reduce the molecular weight (MW) of polymer in the reactor or zone producing CEB thus leading to better overall balance between the length of the CEB and CAOB segments.

When operating reactors or zones in series it is necessary to maintain diverse reaction conditions such that one reactor produces CEB and the other reactor produces CAOB. Carryover of ethylene from the first reactor to the second reactor (in series) or from the second reactor back to the first reactor through a solvent and monomer recycle system is preferably minimized. There are many possible unit operations to remove this ethylene, but because ethylene is more volatile than higher alpha olefins, one simple way is to remove much of the unreacted ethylene through a flash step by reducing the pressure of the effluent of the reactor producing CEB and flashing off the ethylene. Another approach is to avoid additional unit operations and to utilize the much greater reactivity of ethylene versus higher alpha olefins such that the conversion of ethylene across the CEB reactor approaches 100%. The overall conversion of monomers across the reactors can be controlled by maintaining the alpha olefin conversion at a high level (90 to 95%).

Suitable catalysts and catalyst precursors for use in preparing CBCs include metal complexes such as disclosed in WO2005/090426, in particular, those disclosed starting on page 20, line 30 through page 53, line 20, which is herein incorporated by reference. Suitable catalysts are also disclosed in US 2006/0199930; US 2007/0167578; US 2008/0311812; U.S. Pat. No. 7,355,089 B2; or WO 2009/012215, which are herein incorporated by reference with respect to catalysts.

In an embodiment, the CBCs comprise propylene, 1-butene or 4-methyl-1-pentene and one or more comonomers. The block polymers of the CBCs comprise in polymerized form propylene and ethylene and/or one or more $C_{4-20}$ α-olefin comonomers, and/or one or more additional copolymerizable comonomers or they comprise 4-methyl-1-pentene and ethylene and/or one or more $C_{4-20}$ α-olefin comonomers, or they comprise 1-butene and ethylene, propylene and/or one or more $C_5$-$C_{20}$ α-olefin comonomers and/or one or more additional copolymerizable comonomers. Additional suitable comonomers are selected from diolefins, cyclic olefins, and cyclic diolefins, halogenated vinyl compounds, and vinylidene aromatic compounds.

Comonomer content in the resulting CBCs may be measured using any suitable technique, such as techniques based on nuclear magnetic resonance (NMR) spectroscopy, for example. It is highly desirable that some or all of the polymer blocks comprise amorphous or relatively amorphous polymers such as copolymers of propylene, 1-butene or 4-methyl-1-pentene and a comonomer, especially random copolymers of propylene, 1-butene or 4-methyl-1-pentene with ethylene, and any remaining polymer blocks (hard segments), if any, predominantly comprise propylene, 1-butene or 4-methyl-1-pentene in polymerized form. Such segments are highly crystalline or stereospecific polypropylene, polybutene or poly-4-methyl-1-pentene, especially isotactic homopolymers.

In an embodiment, the block copolymer of the CBC comprises from 10, or 20, or 30, or 40 to 50, or 60, or 70, or 80, or 90 weight percent crystalline or relatively hard segments percent crystalline or relatively hard segments and from 90, or 80, or 70, or 60 to 50, or 40, or 30, or 20, or 10 weight percent amorphous, or relatively amorphous, segments (soft segments). Within the soft segments, the mole percent comonomer may range from 10 mol %, or 20 mol %, or 30 mol %, or 33 mol % to 75 mol %, or 80 mol %, or 90 mol %. In the case wherein the comonomer is ethylene, the ethylene is present in an amount of 10 mol %, or 20 mol %, or 30 mol %, or 33 mol % to 75 mol %, or 80 mol %, or 90 mol %.

In an embodiment, the copolymers comprise hard segments from 90 mol %, or 91 mol %, or 93 mol %, or 95 mol % to 97 mol %, or 99 mol %, or 100 mol % propylene. Such hard segments have corresponding melting points that are from 80° C., or 90° C., or 100° C. to 105° C., or 110° C., or 115° C., or 120° C., or 125° C.

In an embodiment, the CBCs have a Tm from greater than 100° C., or 105° C., or 110° C. to 115° C., or 120° C., or 125° C. The MFR of the block composite is from 0.1 g/10 min, or 30 g/10 min, or 50 g/10 min to 100 g/10 min, or 1000 g/10 min.

In an embodiment, the CBCs comprise ethylene, propylene, 1-butene or 4-methyl-I-pentene and optionally one or more comonomers in polymerized form. The block copolymers of the crystalline block composites comprise in polymerized form ethylene, propylene, 1-butene, or 4-methyl-I-pentene and optionally one or more C4-20 α-olefin comonomers. Additional suitable comonomers are selected from diolefins, cyclic olefins, and cyclic diolefins, halogenated vinyl compounds, and vinylidene aromatic compounds.

Comonomer content in the resulting block composite polymers may be measured using any suitable technique, with techniques based on nuclear magnetic resonance (NMR) spectroscopy preferred.

In an embodiment, the crystalline block composite polymers comprise from 0.5, or 49 to 79, or 95 wt % CEP, from 0.5, or 49 to 79, or 95 wt % CAOP and from 5, or 20 to 50, or 99 wt % block copolymer. Weight percents are based on total weight of crystalline block composite. The sum of the weight percents of CEP, CAOP and block copolymer equals 100%.

In an embodiment, the block copolymer of the CBC comprises from 5 to 95 weight percent crystalline ethylene blocks (CEB) and 95 to 5 wt percent crystalline alpha-olefin blocks (CAOB). They may comprise 10 wt % to 90 wt % CEB and 90 wt % to 10 wt % CAOB. The block copolymers may comprise 25 to 75 wt % CEB and 75 to 25 wt % CAOB. The block copolymers may comprise 30 to 70 wt % CEB and 70 to 30 wt % CAOB.

In an embodiment, the crystalline block composite has a Crystalline Block Composite Index (CBCI), as defined below, that is greater than zero but less than 0.4 or from 0.1 to 0.3. In other embodiments, CBCI is greater than 0.4 and up to 1.0. In some embodiments, the CBCI is in the range of from 0.1 to 0.9, from 0.1 to 0.8, from 0.1 to 0.7 or from 0.1 to 0.6. Additionally, the CBCI can be in the range of from 0.4 to 0.7, from 0.5 to 0.7, or from 0.6 to 0.9. In some embodiments, CBCI is in the range of from 0.3 to 0.9, from 0.3 to 0.8, or from 0.3 to 0.7, from 0.3 to 0.6, from 0.3 to 0.5, or from 0.3 to 0.4. In other embodiments, CBCI is in the range of from 0.4 to 1.0, from 0.5 to 1.0, or from 0.6 to 1.0, from 0.7 to 1.0, from 0.8 to 1.0, or from 0.9 to 1.0.

The core layer is free of styrene, or is otherwise free of a styrenic block copolymer.

In an embodiment, the core layer is free of styrene and the core layer includes:

(1) from 60 wt %, or 65 wt % to 70 wt %, or 75 wt %, or 80 wt % propylene/α-olefin copolymer;

(2) from 20 wt % to 25 wt %, or 30 wt % ethylene-based elastomer; and (3) from 1 wt %, or 3 wt % to 5 wt %, or 7 wt % CBC.

It is understood that the aggregate weight percent of the propylene/α-olefin copolymer, the weight percent of the ethylene-based elastomer, and the weight percent of the CBC yield 100 wt %. Weight percent is based on the total weight of the core layer.

5. Multilayer Film

In an embodiment, the multilayer film includes
from 5 vol % to 15 vol % Layer A,
from 5 vol % to 15 vol % Layer B; and
from 70 vol % to 90 vol % Layer C.

In an embodiment, the multilayer film of the retort pouch includes from 5 vol %, or 10 vol % to 15 vol % layer A, and layer A is composed of from 80 wt % to 90 wt % propylene homopolymer and from 20 wt % to 10 wt % styrenic-based block copolymer;

from 5 vol %, or 10 vol % to 15 vol % layer B, and layer B is composed of from 80 wt % to 90 wt % propylene/ethylene copolymer and from 20 wt % to 10 wt % styrenic-based block copolymer.

from 70 vol %, or 80 vol % to 90 vol % layer C, and layer C is composed of (1) from 65 wt % to 75 wt % propylene/α-olefin copolymer, (2) from 20 wt % to 30 wt % ethylene-based elastomer, (3) from 3 wt % to 7 wt % of the CBC (hereafter Film 1).

In an embodiment, Film 1 has a haze value (post-retort) from 4, or 5, or 6 to 7, or 8, or less than 9.

In an embodiment, Film 1 has a haze value (post-retort) from 4, or 5, or 6 to 7, or 8, or less than 9, and Film 1 has a Dart impact strength (at −10° C.) from 0.6 Jouces (J) or 0.8 J to 1.2 J, or 1.5 J.

In an embodiment, the retort pouch 10 is wrinkle-free, or substantially wrinkle-free, post retort.

The retort pouch 10 is designed to withstand a maximum applied temperature in the range of 120 to 135° C. (or any individual value or subrange therein) for 30 to 90 minutes without significant degradation.

The retort pouch may comprise two or more embodiments as disclosed herein.

By way of examples, and not limitation, examples of the present disclosure are provided.

EXAMPLES

The materials used in the inventive examples and in the comparative samples are provided in Table 1 below.

TABLE 1

| Material | Composition | Properties | Source |
|---|---|---|---|
| PURELL HP570M density | propylene homopolymer (hPP) | 0.90 g/cc 7.5 MFR | Lyondellbasell |
| PURELL RP 271G | propylene/ethylene copolymer (rPP) | 0.9 g/cc 1.7 MFR | Lyondellbasell |
| G1645M | styrene/ethylene/butene/styrene block copolymer (SEBS) | 2.0-4.5 MI styrene content 11.5-13.5 wt % | Kraton |
| AFFINITY ™ EG8100G | ethylene/octene copolymer (POE) | 0.870 g/cc 1.0 MI | The Dow Chemical Company |
| CBC1 | crystalline block composite | EP/iPP CBC, 50/50, 90% C2 in EP, 0.905 g/cc 9.8 MFR | The Dow Chemical Company |

TABLE 2

Crystalline Block Composite Physical Properties

| Example | MFR (230° C./ 2.16 kg) | wt % PP from HTLC Separation | Mw Kg/mol | Mw/Mn | Total wt % $C_2$ | Tm (° C.) Peak 1 (Peak 2) | Tc (° C.) | Melt Enthalpy (J/g) | Crystalline Block Composite Index (CBCI)* |
|---|---|---|---|---|---|---|---|---|---|
| CBC1 | 9.8 | 19.9 | 103.6 | 2.73 | 47.6 | 107.9 (130.0) | 87.8 | 95 | 0.549 |

*Procedure for determining CBCI is disclosed in US20140323656, incorporated herein by reference.

Table 3 shows the ratio of iPP to EP as well as the estimated crystalline block composite index for CBC1.

TABLE 3

Crystalline Block Composite Index Estimation

| Sample | wt % iPP | wt % EP | wt % $C_2$ in EP |
|---|---|---|---|
| CBC1 | 50 | 50 | 90 |

1. Film Fabrication

Three different multilayer films are produced with structures and compositions (from Table 1) shown in below Table 4 below. The total thickness of each film is 190 microns. The composition of the skin layer and the composition of the seal layer is same for each of the three films. The composition of the core layer is adjusted to examine the compatibility of modifier with propylene-based polymer in the core layer. The core layer for the comparative samples (CS1, CS2) is composed of a commercial-grade SEBS modified formulation and POE modified formulation.

After fabrication, each multilayer film is subjected to a retort process (sterilization process) at 121° C. for 30 mins. Haze data is tested before and after retort. The results are shown in Table 4 below.

TABLE 4

Formulation and Layer Information for the Three IV Bag Films

| | Layer Ratio | CS1 | CS2 | Example 1 |
|---|---|---|---|---|
| Skin layer | 10% | 90% hPP 10% SEBS | 90% hPP 10% SEBS | 90% hPP 10% SEBS |
| core layer | 80% | 70% rPP 30% SEBS | 70% rPP 30% POE | 70% rPP 25% POE 5% CBC1 |
| Seal layer | 10% | 80% rPP 20% SEBS | 80% rPP 20% SEBS | 80% rPP 20% SEBS |
| Total thickness | | 190 microns | 190 microns | 190 microns |
| Haze Pre-retort (%) | | 6.94 | 4.04 | 3.78 |
| Haze Post-retort (%) | | 8.87 | 9.54 | 7.55 |
| Dart impact* (post-retort) | | 0.87 J | 1.26 J | 1.02 J |

*low temp dart impact strength -- Energy to max load$^{-1}$ (J) at −10° C.

Example 1 shows better (lower) haze value (pre-retort and post-retort) compared to CS1 and CS2.

Taking haze and low temperature dart impact strength into consideration, Example 1 has the best balance of properties among all the three multilayer films. Example 1 exhibits improved (lower haze) while maintaining the same, or better, Dart impact strength (at −10° C.), when compared to CS1 and CS2. Bounded by no particular theory, it is believed CBC1 having a density of less than 0.91 g/cc contributes to the same or better Dart impact strength compared to CS1 and CS2.

It is specifically intended that the present disclosure not be limited to the embodiments and illustrations contained herein, but include modified forms of those embodiments including portions of the embodiments and combinations of elements of different embodiments as come with the scope of the following claims.

The invention claimed is:

1. A retort pouch comprising:
a multilayer film with at least three layers comprising
   (A) a skin layer comprising a blend of a propylene-based polymer and a styrenic block copolymer;
   (B) a seal layer comprising a blend of a propylene-based polymer and a styrenic block copolymer;
   (C) a core layer located between the skin layer (A) and the seal layer (B), the core layer comprising a blend of
      (1) a propylene-based polymer,
      (2) an ethylene-based polymer, and
      (3) a crystalline block composite (CBC).

2. The retort pouch of claim 1 wherein the core layer (C) is void of styrene.

3. The retort pouch of claim 1 wherein the propylene-based polymer in the seal layer is a propylene/α-olefin copolymer.

4. The retort pouch of claim 1 wherein the styrenic block copolymer in the seal layer is a styrene-ethylene-butene-styrene block copolymer.

5. The retort pouch of claim 1 wherein the crystalline block composite CBC comprises
   (i) a crystalline ethylene polymer (CEP) comprising at least 90 mol % polymerized ethylene;
   (ii) a crystalline alpha-olefin-based polymer (CAOP) and
   (iii) a block copolymer comprising
      (A) a crystalline ethylene block (CEB) block comprising at least 90 mol % polymerized ethylene and
      (B) a crystalline alpha-olefin block (CAOB).

6. The retort pouch of claim 1 comprising
from 5 vol % to 15 vol % layer A;
from 5 vol % to 15 vol % layer B; and
from 70 vol % to 90 vol % layer C.

7. The retort pouch of claim 6 wherein
layer A comprises from 80 wt % to 90 wt % propylene homopolymer and from 20 wt % to 10 wt % styrenic block copolymer;
layer B comprises from 80 wt % to 90 wt % propylene/ethylene copolymer and from 20 wt % to 10 wt % styrenic block copolymer; and
layer C comprises
   (1) from 65 wt % to 75 wt % propylene/α-olefin copolymer,
   (2) from 20 wt % to 30 wt % ethylene-based elastomer,
   (3) from 3 wt % to 7 wt % of the CBC.

8. The retort pouch of claim 7 wherein the multilayer film has a haze value (post-retort) from 4 to less than 9.

9. The retort pouch of claim 8 wherein the multilayer film has a Dart impact strength (at −10° C.) from 0.6 J to 1.5 J.

10. The retort pouch of claim 9 wherein the retort pouch is a IV bag.

11. The retort pouch of claim 1 wherein the styrenic block copolymer in the skin layer and the styrenic block copolymer in the seal layer each is a styrene-ethylene-butene-styrene block copolymer.

12. The retort pouch of claim 1 wherein the propylene-based polymer in the skin layer is a propylene homopolymer.

* * * * *